(12) United States Patent
Garlov et al.

(10) Patent No.: US 6,345,509 B1
(45) Date of Patent: Feb. 12, 2002

(54) REFRIGERATION OF A FOOD TRANSPORT VEHICLE UTILIZING LIQUID NITROGEN

(75) Inventors: Roland Garlov; Vladymyr Saveliev; Konstantin Gavrylov; Leonid Golovin, all of Kharkov (UA); Howard Pedolsky, Silver Spring, MD (US)

(73) Assignee: Ukram Industries, Kensington, MD (US)

( * ) Notice: Subject to any disclaimer, the term of this patent is extended or adjusted under 35 U.S.C. 154(b) by 0 days.

(21) Appl. No.: 09/488,705

(22) Filed: Jan. 21, 2000

(51) Int. Cl.[7] ............................................. F25D 25/00
(52) U.S. Cl. ........................................................ 62/62
(58) Field of Search ............................... 62/50.2, 52.1, 62/89, 62

(56) References Cited

U.S. PATENT DOCUMENTS

| | | |
|---|---|---|
| 3,464,222 A | 9/1969 | Gramse |
| 3,464,224 A * | 9/1969 | Swanson .................. 62/80 |
| 3,714,793 A * | 2/1973 | Eigenbrod ................ 62/62 |
| 4,060,400 A | 11/1977 | Williams |
| 5,729,983 A * | 3/1998 | Garrett et al. ............ 62/46.1 |
| 6,044,648 A * | 4/2000 | Rode ........................ 62/62 |

FOREIGN PATENT DOCUMENTS

SU        12 04 888        1/1986

* cited by examiner

Primary Examiner—William Doerrler
Assistant Examiner—Malik N. Drake
(74) Attorney, Agent, or Firm—Burns, Doane, Swecker & Mathis, LLP

(57) ABSTRACT

The atmosphere of a refrigeration space of a food transport vehicle is controlled by cooling the interior space to a preselected temperature by spraying liquid nitrogen within the space. After discontinuing the spraying, liquid nitrogen is conducted through a heat exchanger which extends across a portal communicating the space with ambient air. A ventilator forces air through the portal and the heat exchanger and into the space, whereby the ambient air is cooled and displaces gaseous nitrogen from the space. This creates a cold breathable atmosphere within the space to enable food to be loaded or unloaded. During the loading/unloading operation, liquid nitrogen can be conducted through an evaporator disposed in the space to maintain the temperature in the space.

16 Claims, 2 Drawing Sheets

REFRIGERATION OF A FOOD TRANSPORT VEHICLE UTILIZING LIQUID NITROGEN

BACKGROUND OF THE INVENTION

The present invention relates to methods and apparatus for refrigerating food being transported by a vehicle to successive unloading sites.

Food is typically transported to grocery stores by trucks which carry enough food to supply a plurality of stores. Thus, such a truck stops repeatedly at successive stores, whereupon workers at each store enter the truck and unload selected amounts of food.

Some trucks carry food that must be kept refrigerated. To that end, the truck includes a cooling system, typically a mechanical compressor-based system which also includes an evaporator and a condenser. Such a system is costly and subject to mechanical breakdown which can adversely affect the quality of the food. In addition, the coolant which is circulated in such a system can pollute the atmosphere if it leaks out.

Cooling systems for vehicles are known which utilize liquid nitrogen as a cooling source, either in combination with, or in lieu of, compressor-based systems. However, there is a problem in that a space cooled by the direct introduction of liquid nitrogen will possess an atmosphere containing so much gaseous nitrogen that it may not be breathable, thereby posing a safety risk to workers. Examples of refrigeration vehicles utilizing liquid nitrogen can be found in U.S. Pat. Nos. 4,060,400 and 3,464,222 as well as Soviet Patent No. 1,204,888.

In U.S. Pat. No. 4,060,400 there is disclosed a refrigerator semi-trailer intended for the transportation of frozen food products for short and long distances. For this application the semi-trailer is equipped with an automated cooling apparatus that includes both a compressor-based system and a cryogenic system. The compressor-based system is used for preliminary cooling of the empty trailer interior to a specified level. If further cooling is required in situations where the compressor system is not efficient, liquid nitrogen is injected directly within the refrigerated space. This arrangement possesses the above-described disadvantages associated with compressor-based systems. Also, the liquid nitrogen system cannot be used during loading/unloading of the truck, because there would not be a breathable atmosphere in the truck.

The Soviet Patent No. 1,204,888 describes a transport refrigeration system for delivery of perishable produce, wherein the liquid nitrogen is fed into open trays located along interior side walls of the refrigerator body. The liquid nitrogen evaporates in the trays, causing a cold vapor of gaseous nitrogen to leave the trays and fill the trailer body, thus cooling down the transported cargo. This system lacks safety provisions to ensure a breathable atmosphere, and the capability to safely and efficiently refrigerate with the doors open.

U.S. Pat. No. 3,464,222 discloses a refrigerator vehicle in the form of a railway car utilizing a liquid nitrogen system. The liquid nitrogen is conducted through a spray tube arrangement, and simultaneously through an evaporator arrangement. As the liquid nitrogen flows through the evaporator arrangement, it is converted to gaseous nitrogen which is used to drive a fan for drawing air into the space to achieve environmental control. Thus, as liquid nitrogen is sprayed within the space, air is drawn into the space. However, a serious safety risk would still be present due to the significant amount of gaseous nitrogen occupying the space, if the spraying were to occur while the car is being loaded or unloaded. If such spraying does not take place during loading or unloading, then the car may become excessively heated, placing the food in jeopardy.

SUMMARY OF THE INVENTION

One aspect of the present invention involves a method of maintaining a temperature of a refrigeration space of a food transport vehicle, comprising the steps of:
A) cooling the refrigeration space to a preselected temperature by spraying liquid nitrogen within the space;
B) discontinuing step A;
C) conducting liquid nitrogen through a heat exchanger extending across a portal which communicates the space with ambient air; and
D) actuating a ventilator to force air through the portal and the heat exchanger and into the space, whereby the ambient air is cooled in the heat exchanger and displaces gaseous nitrogen from the space to create a cold breathable atmosphere.

In another aspect of the invention, the temperature of the refrigeration space can be initially reduced and maintained during the on-loading of food, by operating the ventilator in reverse, to draw air into the refrigeration space from a cooled food storehouse and circulate that air through the refrigeration space and out through the portal. No nitrogen is expended at this time.

Another aspect of the present invention relates to a refrigeration vehicle for transporting refrigerated food. The vehicle comprises a vehicle body forming a refrigeration space for containing food, a supply of liquid nitrogen on the vehicle, and a portal disposed in a wall of the vehicle for communicating the space with ambient air. A heat exchanger extends across the portal, and a ventilator is provided for forcing ambient air through the portal and the heat exchanger and into the space, whereby the ambient air is cooled in the heat exchanger. A sprayer arrangement is disposed in the space, and a conduit arrangement is provided for conducting liquid nitrogen from the supply to the sprayer arrangement and the heat exchanger. Valving is disposed in the conduit arrangement and is disposed selectively in a first mode for admitting liquid nitrogen to the sprayer arrangement to the exclusion of the heat exchanger, and a second mode for admitting liquid nitrogen to the heat exchanger to the exclusion of the sprayer arrangement.

BRIEF DESCRIPTION OF THE DRAWINGS

The objects and advantages of the invention will become apparent from the following detailed description of preferred embodiments thereof in connection with the accompanying drawings in which like numerals designate like elements and in which.

DETAILED DESCRIPTION OF PREFERRED EMBODIMENTS OF THE INVENTION

Figure 1:
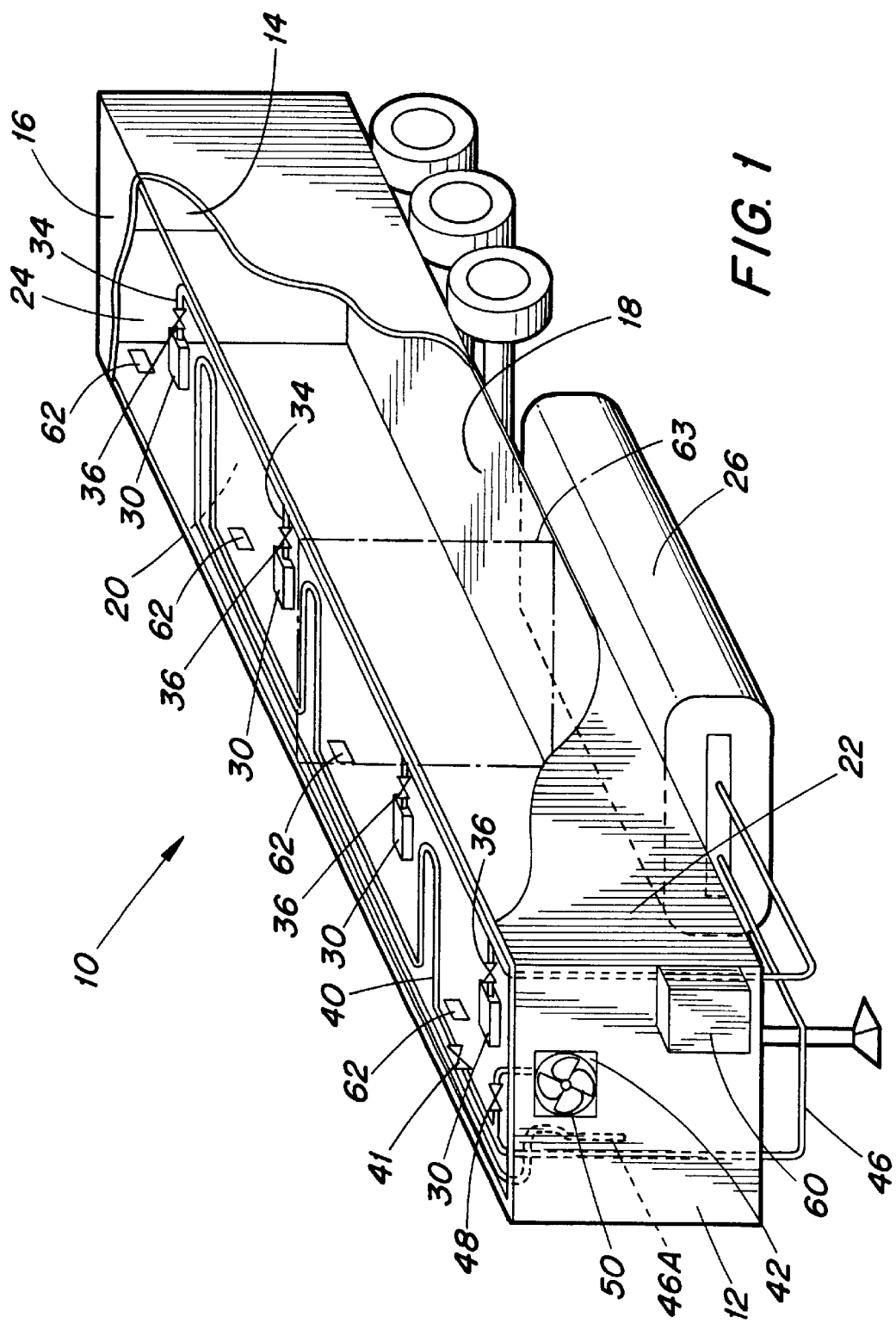
FIG. 1 is a top perspective view of a refrigeration vehicle according to the present invention, with portions of side and top walls thereof broken away.
Figure 2:
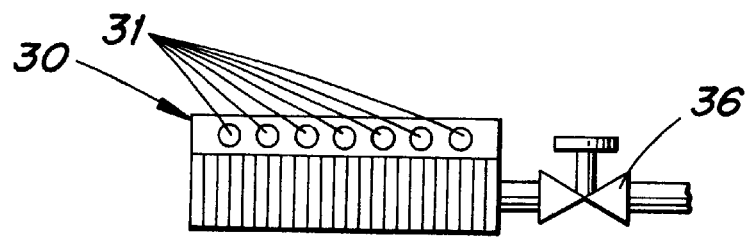
FIG. 2 is a side view of a sprayer head disposed in the vehicle of FIG. 1.

Depicted in FIG. 1 is a refrigeration truck 10 for the transporting of perishable food. The truck comprises a body or shell formed by a front wall 12, a rear wall 14, a top wall 16, a floor 18, and side walls 20, 22, some or all of the walls preferably being thermally insulated. A door 24 is provided in the rear wall 14 to afford access to the refrigeration space of the truck body for the loading and unloading of food.

Mounted beneath the floor 18 is a tank 26 containing liquid nitrogen. Alternatively, the tank could be built-into the walls of the truck body. Situated within the refrigeration space is a plurality of spray heads 30 each comprising a plurality of spray nozzles 31 connected to a manifold. The spray heads 30 are mounted beneath the top wall 16 and are fluidly connected to the tank 26 by a main conduit 32 and respective sub-conduits 34. A remotely controllable valve 36 is disposed in each sub-conduit 34 for controlling the supply of liquid nitrogen to the spray heads 30.

The nozzles 31 are preferably arranged in a fan-like array to spray in all horizontal directions. The spray heads 30 are thus horizontally spaced from one another and from all vertical walls 12, 14, 20, 24 and are arranged along a longitudinal center line adjacent the top of the refrigeration space. The number of spray heads 30 is optional, depending upon the length of the space, and whether the space is divided into compartments, as will be later discussed.

Also disposed at the top of the space is an evaporator panel 40 connected to the tank 26 by a conduit 46. The panel 40 can be of conventional construction, i.e., comprised of a pipeline or a pipe coil in thermal contact with an extended heat exchange surface (not shown). The panel is fixed beneath the top wall 16 with a measurable gap situated therebetween to ensure an adequate heat exchange with the atmosphere inside the space. To make the heat exchange surface of the panel perform even more effective, the surface can be perforated and/or corrugated, furnished with special coatings or with conventionally used hardware to avoid freezing. A valve 41, remotely controllable, controls the flow of liquid nitrogen through the evaporator.

Figure 3:
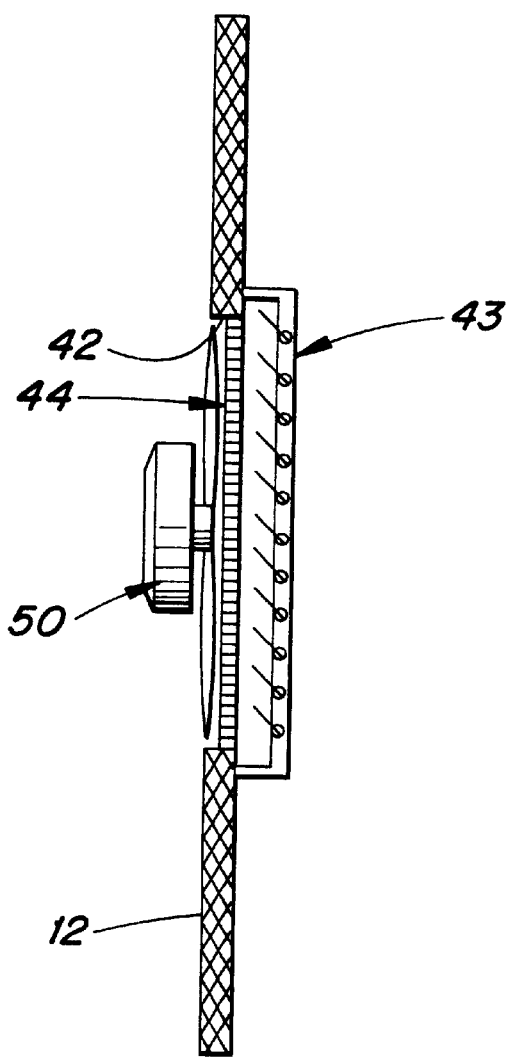
FIG. 3 is a vertical sectional view taken through a portion of a vertical front wall of the vehicle and through a heat exchanger and ventilation arrangement mounted in that vertical wall.

Disposed in the front wall 12 is a portal 42 for communicating the refrigeration space with ambient air. The portal can preferably be opened/closed by any suitable conventional structure, such for example as a louver arrangement 43, or slidable or hinged door (not shown). Extending across the portal 42 is a heat exchanger 44 (FIG. 3). The heat exchanger 44 is of conventional construction, e.g., it comprises coils through which liquid nitrogen can flow. The heat exchanger 44 is connected to the tank 26 via the conduit 46, and a remotely controllable valve 48 controls the supply of liquid nitrogen to the heat exchanger 44.

A ventilator, such as a rotary fan 50, is disposed at the portal 42 for forcing ambient air through the portal 42 and through the heat exchanger 44. If a louver arrangement is employed for closing the portal 42, the louvers could be motor driven, or spring-biased closed and then forced open by the air flow.

As will be explained, by operating the fan while the louver arrangement 43 is open, and liquid nitrogen is being conducted through the heat exchanger, the refrigeration space of the truck can be purged of gaseous nitrogen by a in flow of chilled ambient air, whereby an interior atmosphere is established which is breathable and cold enough to keep the food properly refrigerated.

Temperature sensors 62 are provided in the interior space for detecting temperatures of respective regions of that space.

A main controller 60 is provided which is connected to the sensors 62 and the valves 36, 41, 48 for controlling the flow of liquid nitrogen selectively to the spray heads 30, the evaporator panel 40, and the heat exchanger 44, respectively. The controller 60 is also connected to motors for controlling the fan 50 and the louver arrangement 43 (if motor-driven) such that the portal 42 is kept closed when the fan 50 is de-energized and the valve 48 is closed. It is desired that the portal 42 be kept closed when the refrigeration space is in a cooled state, to minimize the amount of liquid nitrogen needed to cool the space.

Also, a switch (not shown) could be optionally provided which senses when the rear door 24 is open/closed. When the door is open, the valves 36 would automatically be held closed, for safety reasons.

If desired, the refrigeration space could be divided into separate compartments by one or more divider(s) 63.

In operation, the tank 26 is filled with liquid nitrogen at −196° C. Prior to loading the truck with food, the refrigeration space of the truck is pre-cooled by opening the valves 36 to the spray heads 30 to cause liquid nitrogen to be sprayed within the refrigeration space. The liquid nitrogen evaporates and pre-cools the refrigeration space, the walls of the body and all internal elements, to a desired temperature. This can be done while the truck is in transit to, or awaits loading at, a loading site. The valves 36 are completely or partially closed when the desired interior temperature is reached, as detected by the temperature sensors 62.

During this operation, an atmosphere of almost pure gaseous nitrogen, which does not support safe breathing, is created inside the refrigeration space. Because of this, the refrigeration space must be purged with air prior to the loading operation. That purging operation is performed by opening the valve 48 to admit liquid nitrogen to the heat exchanger 44, opening the louver device 43 and the door 24 (or through a separate vent), and actuating the fan 50.

Thus, ambient air is forced into the refrigeration space to displace gaseous nitrogen through the open door 24. Importantly, that ambient air is cooled as it passes through the heat exchanger 44, so that the space maintains a proper temperature. During this operation, the temperature of the space is monitored by the sensors 62 to enable the controller 60 to adjust the valve 48 and thereby control the extent to which the incoming air is cooled, to keep the interior space from becoming too cold.

The purging procedure can be performed prior to arrival of the truck at the loading site, in order to save time.

Once the refrigeration space has been filled with air, and a proper temperature is reached, a food-loading operation is performed. At that time, the valve 48 is closed, the fan 50 is stopped, and the valve 41 is opened to supply liquid nitrogen to the evaporator 40 which cools the inside air as that air contacts heat exchange surfaces of the evaporator. During the loading operation, the interior temperature is monitored by sensors 62, and the controller opens/closes the valve 41 as necessary to maintain the desired interior temperature.

Once the food has been loaded, the door 24 is closed, and the truck is transported to its first destination. During transport, the cooling function is switched back to the spray heads 30 by closing the valve 41 and opening the valves 36. If the truck is subjected to a heavy thermal loading, i.e., if the ambient air is very warm, the spray cooling can be augmented with evaporator cooling by fully or partially opening the valve 41 to supply liquid nitrogen to the evaporator 40.

When the truck reaches its first destination, it is necessary to purge gaseous nitrogen from the refrigeration space. Hence, the purging operation described above is repeated, i.e., the valves 36 and 41 are kept closed, and the valve 48 is opened to direct liquid nitrogen through the heat exchanger 44.

The louver device 44 is opened, and the fan 50 is actuated. This procedure can be initiated before the truck reaches the first destination, so that the truck is ready for unloading when it arrives. During unloading, the temperature within the refrigeration space can be maintained by actuating the evaporator 40.

The above operations are repeated, to enable the truck to travel to numerous unloading sites, while ensuring that the food is always kept at an appropriate temperature.

It will be appreciated that liquid nitrogen flowing through the heat exchanger 44 or the evaporator 40 will be converted into inert gaseous nitrogen, and can be exhausted into the ambient air (e.g., via vent 46A) without a pollution risk.

A particularly advantageous modification to the above-described series of steps is possible by making the fan 50 reversible, i.e. capable of being operated to exhaust air from the refrigeration space of the truck. In that event, when food is to be on-loaded from an air conditioned storehouse, the pre-cooling of the refrigeration space of the truck prior to the on-loading of food is performed by backing the truck to the storehouse so that upon opening the door 24, the refrigeration space communicates with an air-conditioned (chilled) interior of the storehouse. Then, the fan 50 is driven in the reverse mode to draw-in cold air from the storehouse and circulate it through the refrigeration space. In that way, the temperature of the refrigeration space is reduced without the need to expend any nitrogen. That is, the valves 48 and 41 are "off" during this phase of operation. When the refrigeration space reaches a desired temperature, food is on-loaded while the fan continues to be operated in reverse to maintain the cold temperature. Hence, the liquid nitrogen will be conserved.

The tank 26 can be of any suitable conventional type. For example, the tank can be pre-fabricated as a group of small diameter vessels integrated into a complete functional unit. Each vessel could include coaxial interior and exterior walls spaced apart by screen-vacuum thermal insulation. Pressurization of liquid nitrogen in the tank can be affected in any suitable manner, e.g., through the use of a pump, or a small electric heater immersed in the liquid nitrogen.

As noted earlier, the refrigeration space can be divided into a plurality of separate chambers by suitable partitions 63. The partition 63 can be mounted in any suitable fashion, e.g. it could be hinged to the top wall 16 so as to be swingable to an upper inactive position when not needed. When a partition is provided, the spray heads 30 disposed in each chamber would be separately connected to the tank 26, and the evaporator would be divided into separate sections disposed in respective chambers and provided with respective valves 41. Hence, the chambers could be kept at different temperatures, e.g., to store foods having different thermal requirements. The controller would respond to the respective temperature sensors to maintain proper temperature conditions in each chamber. Ideally, the chamber located at the rear of the space would require a higher temperature than the chamber located at the front of the space, so that the rear space would be cooled solely by its respective evaporator section. Thus, the spray heads 30 would not be actuated in the rear chamber, so no purging of gaseous nitrogen from the rear chamber would be necessary. In that way, the fan/heat exchanger 44, 50 would be used only to purge the front chamber. A vent opening could be provided in the top wall 16 near the portal 42 to enable gaseous nitrogen to be purged from the front compartment since the front compartment would not communicate with the door 24 if a partition is used.

Instead of being hinged, the partition could be mounted in any suitable way, including being adjustable forwardly and rearwardly, whereby the sizes of respective compartments can be adjusted.

It will be appreciated that the present invention enables a refrigeration vehicle to be selectively cooled by three different liquid nitrogen mechanisms, i.e., sprayers 30, an evaporator 40, and a heat exchanger 44. If sprayers are employed, the fan/heat exchanger arrangement makes possible a rapid purging of gaseous nitrogen while maintaining a proper food temperature. Hence, the vehicle is ideally suited to the unloading of food at a number of unloading sites successively.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. A method of controlling a temperature of a refrigeration space of a food transport vehicle, comprising the steps of:
   A) cooling the refrigeration space to a preselected temperature by spraying liquid nitrogen within the space;
   B) discontinuing step A;
   C) conducting liquid nitrogen through an interior of a heat exchanger extending across a portal which communicates the space with ambient atmospheric air while isolating the interior of the heat exchanger from the portal; and
   D) actuating a ventilator to force ambient atmospheric air through the portal and the heat exchanger and into the space, whereby the ambient atmospheric air is cooled and displaces gaseous nitrogen from the space to create therein a cold breathable atmosphere.

2. The method according to claim 1 further including the steps of terminating step D, and conducting liquid nitrogen through an evaporator disposed in the space.

3. The method according to claim 1 further including the step of loading food into, or unloading food from, the space during the conducting of liquid nitrogen through the evaporator.

4. The method according to claim 1 wherein step A further includes conducting liquid nitrogen through an evaporator disposed in the space.

5. The method according to claim 1 further including the step of sensing a temperature within the space and controlling the spraying of liquid nitrogen in step A to maintain a preselected temperature in the space.

6. The method according to claim 1 wherein step A comprises spraying liquid nitrogen in different regions of the space, sensing temperatures of the respective regions, and controlling the spraying of liquid nitrogen in the respective regions to maintain preselected temperatures therein.

7. A method of controlling a temperature of a refrigeration space of a food transport vehicle, comprising the steps of:
   A) communicating the refrigeration space with a chilled space of a food storehouse;
   B) opening a portal in the truck for communicating the refrigeration space with ambient atmosphere;
   C) actuating a reversible ventilator in a first mode for drawing chilled air into the refrigeration space from the storehouse and circulating the drawn-in chilled air through the refrigeration space and outwardly through the portal, for reducing the temperature of the refrigeration space;

D) loading food into the refrigeration space while continuing to actuate the reversible ventilator in the first mode;

E) transporting the truck to an unloading site while spraying liquid nitrogen within the refrigeration space;

F) opening the door at the unloading site;

G) conducting liquid nitrogen through a heat exchanger extending across the portal; and H) actuating the ventilator in a second mode to force ambient air through the portal and the heat exchanger and into the refrigeration space, whereby the ambient air is cooled and displaces gaseous nitrogen from refrigeration space to create a cold breathable atmosphere.

8. A refrigeration vehicle for transporting refrigerated food, comprising:

a vehicle body forming a refrigeration space for containing food;

a supply of liquid nitrogen on the vehicle;

a portal disposed in a wall of the vehicle for communicating the space with ambient air;

a heat exchanger extending across the portal;

a ventilator for forcing ambient air through the portal and the heat exchanger and into the space, whereby ambient air is cooled as it passes through the heat exchanger;

a sprayer arrangement disposed in the space;

a conduit arrangement for conducting liquid nitrogen from the supply to the sprayer arrangement and the heat exchanger; and valving disposed in the conduit arrangement and positionable selectively in a first mode for admitting liquid nitrogen to the sprayer arrangement to the exclusion of the heat exchanger, and a second mode for admitting liquid nitrogen to the heat exchanger to the exclusion of the sprayer arrangement.

9. The vehicle according to claim 8 further including an evaporator disposed in the space, the conduit arrangement being operable to conduct liquid nitrogen from the supply to the evaporator, the valving being operable for admitting liquid nitrogen to the evaporator jointly with, or to the exclusion of, the sprayer arrangement, and jointly with, or to the exclusion of, the heat exchanger.

10. The vehicle according to claim 8 further including a temperature sensor for detecting a temperature within the space, and a controller connected to the valving and the temperature sensor for actuating the valving to maintain a preselected temperature in the space.

11. The vehicle according to claim 8, wherein the sprayer arrangement comprises a plurality of sprayer heads disposed in respective regions of the space, and further including a plurality of temperature sensors for detecting temperatures in respective ones of the regions, and a controller connected to the valving and the temperature sensors for controlling the spraying of liquid nitrogen in the respective regions to maintain preselected temperatures therein.

12. The vehicle according to claim 8 wherein the sprayer arrangement is spaced from all vertical walls of the vehicle body and comprises an array of nozzles for spraying liquid nitrogen horizontally toward all of the vertical walls.

13. The vehicle according to claim 8 further including a closure mechanism for selectively closing the portal.

14. The vehicle according to claim 8 wherein the ventilator is reversible for selectively forcing air into or from the space.

15. A method of controlling a temperature of a refrigeration space of a food transport vehicle, comprising the steps of:

A) cooling the refrigeration space to a preselected temperature by spraying liquid nitrogen within the space;

B) discontinuing step A;

C) conducting liquid nitrogen through a heat exchanger extending across a portal which communicates the space with ambient air;

D) actuating a ventilator to force ambient air through the portal and the heat exchanger and into the space, whereby the ambient air is cooled and displaces gaseous nitrogen from the space to create a cold breathable atmosphere; and E) terminating step D, and conducting liquid nitrogen through an evaporator disposed in the space.

16. A method of controlling a temperature of a refrigeration space of a food transport vehicle, comprising the steps of:

A) cooling the refrigeration space to a preselected temperature by spraying liquid nitrogen within the space and conducting liquid nitrogen through an evaporator disposed in the space;

B) discontinuing step A;

C) conducting liquid nitrogen through a heat exchanger extending across a portal which communicates the space with ambient air; and D) actuating a ventilator to force ambient air through the portal and the heat exchanger and into the space, whereby the ambient air is cooled and displaces gaseous nitrogen from the space to create a cold breathable atmosphere.

* * * * *